(12) United States Patent
Harihara Gupta et al.

(10) Patent No.: US 12,103,431 B2
(45) Date of Patent: Oct. 1, 2024

(54) SYSTEM AND METHODS FOR BATTERY AND CABIN COOLING IN ELECTRIC VEHICLES

(71) Applicant: Rivian IP Holdings, LLC, Plymouth, MI (US)

(72) Inventors: Omnaath Guptha Harihara Gupta, Livermore, CA (US); Dewashish Prashad, Irvine, CA (US); Ajay Panekkad, Laguna Niguel, CA (US)

(73) Assignee: Rivian IP Holdings, LLC, Plymouth, MI (US)

( * ) Notice: Subject to any disclaimer, the term of this patent is extended or adjusted under 35 U.S.C. 154(b) by 289 days.

(21) Appl. No.: 17/382,137

(22) Filed: Jul. 21, 2021

(65) Prior Publication Data

US 2023/0023466 A1  Jan. 26, 2023

(51) Int. Cl.
| | |
|---|---|
| *H01M 10/613* | (2014.01) |
| *B60K 11/02* | (2006.01) |
| *B60L 1/00* | (2006.01) |
| *B60L 50/60* | (2019.01) |
| *B60L 58/26* | (2019.01) |
| *B60K 1/00* | (2006.01) |

(52) U.S. Cl.
CPC .............. *B60L 58/26* (2019.02); *B60K 11/02* (2013.01); *B60L 1/003* (2013.01); *B60L 50/60* (2019.02); *H01M 10/613* (2015.04); *B60K 2001/005* (2013.01); *B60L 2240/34* (2013.01)

(58) Field of Classification Search
CPC .......... B60L 58/26; B60L 1/003; B60L 50/60; B60L 2240/34; B60K 11/02; B60K 2001/005; H01M 10/613; H01M 10/625; H01M 10/663; B60H 2001/00307; B60H 2001/325; B60H 2001/3272; B60H 1/00278; B60H 1/00392; B60H 1/3208; Y02T 10/70
See application file for complete search history.

(56) References Cited

U.S. PATENT DOCUMENTS

| | | | | |
|---|---|---|---|---|
| 4,612,776 | A | * | 9/1986 | Alsenz ............... G05D 23/1912 236/1 EA |
| 2016/0290671 | A1 | * | 10/2016 | Schuster ............... F25B 49/025 |
| 2016/0339760 | A1 | | 11/2016 | Dunn et al. |
| 2021/0283978 | A1 | * | 9/2021 | Bray .................... B60H 1/3205 |

* cited by examiner

*Primary Examiner* — Muhammad S Siddiquee
(74) *Attorney, Agent, or Firm* — Haley Guiliano LLP (57) ABSTRACT

A vehicle includes a vehicle cooling system for cooling a cabin and a battery system, each having a respective target operating range. The cooling system is configured to select among a cabin-only mode, battery-only mode, or a hybrid cooling mode for cooling the cabin and the battery system. In the hybrid mode, the system determines a desired pressure at an inlet of a compressor corresponding to a suction pressure of the compressor, to avoid cooling interruptions. The system generates a control signal based on the desired suction pressure, and applies the control signal to the compressor. Generating the control signal may include generating a feedforward signal the desired suction pressure, generating a feedback signal based on the suction pressure, or a combination thereof. For example, the use of hybrid mode based on suction pressure allows smoother response to targets with reduced delays in response in meeting the cooling demands.

20 Claims, 4 Drawing Sheets

SYSTEM AND METHODS FOR BATTERY AND CABIN COOLING IN ELECTRIC VEHICLES

INTRODUCTION

The present disclosure is directed to systems and methods for providing uninterrupted and smooth compressor control for battery and cabin cooling in electric vehicle. To illustrate, feedforward and feedback control may be used to provide thermal management of an electric vehicle taking into account disturbances such as transitions between cabin-only, battery-only, and hybrid cooling modes.

SUMMARY

In some embodiments, the present disclosure is directed to a method, implemented using control circuitry, for controlling a vehicle cooling system configured to provide cooling to a cabin and a battery system. The method includes determining a compressor suction pressure target at an inlet of a compressor of the vehicle cooling system, generating a control signal based on the compressor suction pressure target, and causing a suction pressure of the compressor to be adjusted based on the control signal to achieve the compressor suction pressure target.

In some embodiments, the method includes selecting from among the hybrid mode, a cabin-only mode, and a battery-only mode. For example, in some embodiments, the method includes receiving at least one cooling request, and selecting from among the hybrid mode, the cabin-only mode, and the battery-only mode for the vehicle cooling system based on the at least one cooling request. In some embodiments, the method includes selecting a hybrid cooling mode for cooling a cabin and a battery system coupled to the vehicle cooling system, determining a desired pressure at an inlet of a compressor, generating a control signal based on the desired pressure, and applying the control signal to the compressor to achieve the desired pressure. The desired pressure corresponds to a suction pressure at the inlet of the compressor.

In some embodiments, the method includes generating the control signal by generating a feedforward signal based on a mapping between the compressor suction pressure target and a speed of the compressor, and generating a feedback signal based on a sensor signal corresponding to the suction pressure of the compressor. In some embodiments, generating the control signal includes generating a feedforward signal based on a mapping between the desired pressure and a speed of the compressor. In some embodiments, generating the control signal includes generating a feedback signal based on a measured value corresponding to the suction pressure. In some embodiments, generating the control signal includes generating a feedback signal based on an evaporator temperature. In some embodiments, the method includes sensing the suction pressure of the compressor, an evaporator temperature, or a coolant temperature of the battery system, or combinations thereof, using a suitable sensor.

In some embodiments, the method includes the system receiving an input indicative of a desired cooling target, and selecting the hybrid cooling mode is based on the input. For example, in some embodiments, the input is received at control circuitry from a user interface, a central controller, other control circuitry, or a combination thereof. In a further example, the cabin air cooling target may be selected by a vehicle occupant using a user interface, while the battery cooling target may be determined by control circuitry based on a temperature and/or heat load of the battery system. In some embodiments, the method includes receiving a first input indicative of a desired cooling target of the cabin, and receiving a second input indicative of a desired cooling target of the battery system. The method includes determining the compressor suction pressure target based on the first input and the second input.

In some embodiments, the method includes transitioning from a cabin-only mode to a hybrid mode of the vehicle cooling system based on a cooling request of the battery system. The method includes the control circuitry determining the compressor suction pressure target to reduce cooling disturbances to the cabin as a result of transitioning from the cabin-only mode to the hybrid mode.

In some embodiments, the present disclosure is directed to a system including a thermal refrigeration system and control circuitry. The control circuitry is configured to execute instructions encoded on a non-transitory computer-readable medium. The control circuitry is coupled to the thermal refrigeration system and is configured to perform the method disclosed herein. For example, the control circuitry is configured to determine a compressor suction pressure target at an inlet of the compressor, generate a control signal based on the compressor suction pressure target, and cause a suction pressure of the compressor to be adjusted based on the control signal to achieve the compressor suction pressure target.

In some embodiments, the thermal refrigeration system is thermally coupled to a cabin air system and the battery system by one or more heat exchangers or evaporators. For example, in some embodiments, the thermal refrigeration system is thermally coupled to a cabin air system and a battery cooling system, and is further configured to control the cabin air system, the battery cooling system, or both.

In some embodiments, the present disclosure is directed to a non-transitory computer-readable medium having instructions encoded thereon that when executed by control circuitry cause the control circuitry to select a hybrid cooling mode for cooling a cabin and a battery system coupled to the vehicle cooling system, determine a desired pressure at an inlet of a compressor (e.g., indicative of a suction pressure of the compressor), generate a control signal based on the desired pressure, and apply the control signal to the compressor to achieve the desired pressure.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and shall not be considered limiting of the breadth, scope, or applicability of these concepts. It should be noted that for clarity and ease of illustration these drawings are not necessarily made to scale.

DETAILED DESCRIPTION

An electric vehicle may include a battery system, a drivetrain, a cabin air system (e.g., a heater, defroster, and/or air conditioner), a cooling system (e.g., including a refrigeration cycle), control system, and a user interface. The cooling system provides a heat sink for the cabin air system a battery cooling system of the battery system. Because it would be desired to avoid fluctuations of cabin air temperature, fluctuations in battery coolant temperature, or cycling (e.g., on/off) of the cooling system compressor, the systems and methods of the present disclosure provide a hybrid cooling mode wherein the system determines a compressor suction pressure target based on the cooling requests of both the cabin system and the battery system. In some embodiments, a hybrid mode is demanded by the, thus smoothing transitions between targets and reducing delayed responses in compressor operation to meet the cooling demands of the cooling system.

Figure 1:
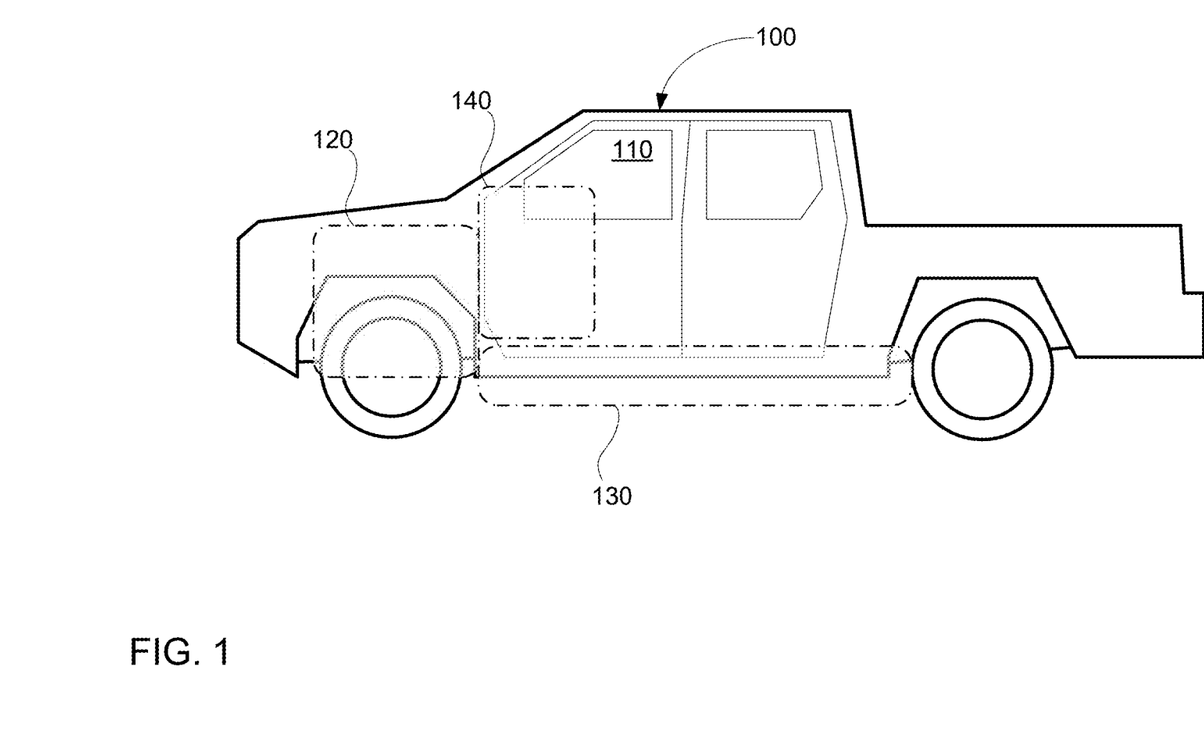
FIG. 1 shows a block diagram of an illustrative vehicle having battery cooling and cabin cooling, in accordance with some embodiments of the present disclosure.

FIG. 1 shows a block diagram of illustrative vehicle 100 having battery cooling and cabin cooling, in accordance with some embodiments of the present disclosure. As illustrated, vehicle 100 includes control system 120, battery system 130, and cabin air system 140 for cooling cabin 110, in accordance with some embodiments of the present disclosure. Control system 120 may include a compressor, a condenser, valving (e.g., controllable and/or fixed) and one or more evaporator units or otherwise heat exchangers, with a working fluid (e.g., any suitable refrigerant, coolant, or other fluid) for achieving a cooling process (e.g., a refrigeration cycle). Control system 120 may include control circuitry for monitoring sensor signals, generating control signals, executing computer readable instructions, receiving inputs, or a combination thereof. Battery system 130 may include a plurality of battery cells (e.g., arranged in one or more modules), power electronics, and a battery cooling system having a liquid coolant or air that receives heat from the battery cells. The battery cooling system may include a pump or compressor, a radiator, a heat exchanger, a manifold, piping, hosing, tubing, fittings, control valving, sensors and other instrumentation, controllers, or any suitable combination thereof. Cabin air system 140 is configured to provide conditioned air to cabin 110 (e.g., an occupant compartment). For example, cabin air system 140 may be configured to provide cabin cooling (e.g., air conditioning), heating, defrosting, venting, or a suitable combination thereof. Cabin air system 140 may include a blower fan, ducting, plenums, dampers or diversion valves, filters, intakes, one or more input interfaces (e.g., knobs, hard buttons, soft buttons, touchscreen interfaces, voice interfaces), a controller, any other suitable components, or any combination thereof. In an illustrative example, a vehicle controller may monitor and control battery system 130, and determine when cooling is needed (e.g., based on ambient conditions, driving conditions, or both). Additionally, an occupant may adjust controls of cabin air system 140 to provide cooled air to cabin 110. Control system 120 is configured to manage cooling, heating, or a combination thereof for both battery system 130 and cabin air system 140 based on the varying demands of each system.

Figure 2:
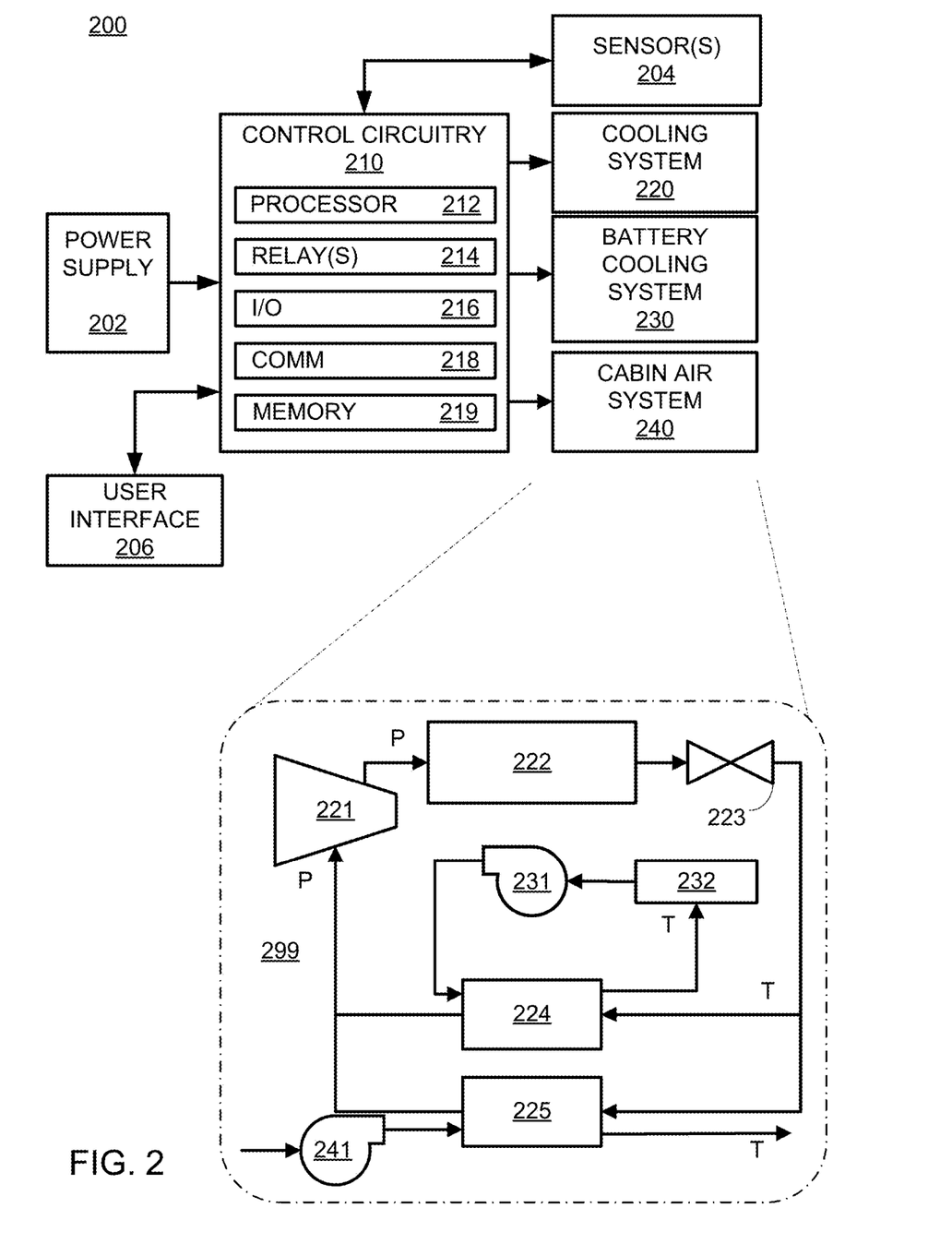
FIG. 2 shows a block diagram of an illustrative system for controlling vehicle cooling, in accordance with some embodiments of the present disclosure.

FIG. 2 shows a block diagram of illustrative system 200 for controlling vehicle cooling, in accordance with some embodiments of the present disclosure. For example, system 200 may be included as part of vehicle 100 of FIG. 1. As illustrated, system 200 includes control circuitry 210, sensors 204, user interface 206, power supply 202, cooling system 220, battery system 230, and cabin air system 240, in accordance with some embodiments of the present disclosure. Illustrative control circuitry 210 includes processor 212, one or more relays 214 (hereinafter referred to as relay(s) 214), input/output 216 (hereinafter referred to as I/O 216), communication hardware 218 (hereinafter referred to as COMM 218), and memory 219.

Control circuitry 210 may include hardware, software, or both, implemented on one or more modules configured to provide control of a cooling system (e.g., cooling system 220). In some embodiments, processor 212 includes one or more microprocessors, microcontrollers, digital signal processors, programmable logic devices, field-programmable gate arrays (FPGAs), application-specific integrated circuits (ASICs), or any suitable combination thereof. In some embodiments, processor 212 is distributed across more than one processor or processing units. In some embodiments, control circuitry 210 executes instructions stored in memory (e.g., non-transitory computer readable memory) for managing cooling of a cabin and a battery system. In some embodiments, memory 219 is an electronic storage device that is part of control circuitry 210. For example, memory may be configured to store electronic data, computer instructions, applications, firmware, or any other suitable information. In some embodiments, memory 219 includes random-access memory, read-only memory, hard drives, optical drives, solid state devices, or any other suitable memory storage devices, or any combination thereof. For example, memory may be used to launch a start-up routine.

In some embodiments, control circuitry 210 is powered by power supply 202. In some embodiments, power supply 202 includes a car battery (e.g., a 12 V lead acid battery), a DC-DC converter, an AC power supply (e.g., generated by suitably inverting a DC power supply), any other power supply, any corresponding components (e.g., terminals, switches, fuses, and cables), or any combination thereof. In some embodiments, power supply 202 supplies power to cooling system 220, battery cooling system 230, cabin air system 240, any other suitable systems or components, or any combination thereof.

In some embodiments, user interface 206 includes a push button, a toggle switch, a turnable knob, a display screen (e.g., a touch screen), a key fob, a key-lock combination, any other suitable system or component for receiving input from a user or providing output to a user, or any combination thereof. In some embodiments, user interface 206 includes a touchscreen on the dash of a vehicle, configured to receive input from the user, and provide a display to the user. In some embodiments, user interface 206 includes one or more buttons that are selectable by a user. For example, the one or more buttons may include a button coupled to a switch, a button on a touchpad, any other suitable button that may be used by a user to make a selection, or any combination thereof. In some embodiments, user interface 206 includes one or more turnable knobs that a user may turn to adjust a temperature or blower setting.

In some embodiments, sensor(s) 204 include one or more temperature sensors (e.g., a thermocouple, thermistor, resistance temperature detector, or optical sensor), pressure sensors (e.g., piezo or strain-based transducers), speed sensors (e.g., a rotary encoder), position sensors (e.g., a rotary encoder), current sensors (e.g., of a compressor motor), flow sensors, any other suitable sensors, or any combination thereof. For example, sensor(s) 204 may be used to measure temperature of a component (e.g., a heat exchanger, a chiller, a compressor), a fluid (e.g., air, coolant, or refrigerant), or a combination thereof. In a further example, sensor(s) 204 may be used to measure pressure or a difference in pressure of a fluid (e.g., air, coolant, or refrigerant). In a further example, sensor(s) 204 may be used to measure a flow rate in air, coolant, or refrigerant (e.g., to determine a cooling or heating rate).

As illustrated, panel 299 illustrates some examples of components of cooling system 220, battery cooling system 230, and cabin air system 240. For example, in panel 299, a parallel-flow evaporator/chiller arrangement is illustrated, although any suitable arrangement allowing for cooling of cabin air and a battery system may be used in accordance with the present disclosure. To illustrate, some illustrate locations of temperature "T" and pressure "P" measurements are shown (e.g., as instances of one or more sensors 204). For example, pressure before and after compressor 221 may be sensed, refrigerant minimum temperature may be sensed (e.g., after valve 223), or cabin air temperature may be sensed. In a further example, inlet and/or outlet fluid temperatures may be measured for each stream passing through heat exchangers 224 and 225 (e.g., to determine a fluid temperature at a particular state, and/or estimate heat transfer rate).

Cooling system 220 may be the same as, similar to, or included as part of control system 120 of FIG. 1. In some embodiments, cooling system 220 include a thermal refrigeration system having a refrigerant as a working fluid. For example, as illustrated in panel 299, cooling system 220 includes compressor 221, condenser 222, valve 223, heat exchanger 224 (e.g., a chiller), and heat exchanger 225 (e.g., an evaporator). Although illustrated as separate heat exchangers 224 and 225 coupled in parallel, a cooling system may include a single heat exchanger (e.g., an evaporator), two heat exchangers coupled in series, or any other suitable heat exchanger configuration in accordance with the present disclosure. Compressor 221 may include any suitable compressor type, driven by an electric motor (e.g., induction motor, switched reluctance motor, or any other suitable electric motor type) and corresponding power electronics of control circuitry 210 (e.g., I/O 216 thereof). The speed of compressor 221 may be controlled by controlling current in each phase of the motor, voltage across each phase of the motor, or a combination thereof over time (e.g., using transistors, a bridge circuit, a variable frequency drive, or using any other suitable control hardware). The pressure of the working fluid increases across compressor 221, from a suction pressure at the inlet to an outlet pressure downstream. To illustrate, in the context of a rotary compressor, the greater rotation rate of the motor, the greater the pressure difference across compressor 221 (e.g., the lower the suction pressure). Condenser 222 may include a liquid-to-air heat exchanger (e.g., a radiator), or any other suitable type of liquid-to-gas or liquid-to-liquid heat exchanger, which is configured to reject heat to a heat receptacle (e.g., environmental air). Valve 223 is configured to reduce the pressure and temperature of the working fluid (e.g., via a throttling process approximated as a constant enthalpy or near-constant enthalpy process), without requiring or producing a work interaction. In some embodiments, valve 223 may be controllable (e.g., have an adjustable effective area), or may be fixed in geometry (e.g., a geometrically fixed flow restriction). Heat exchangers 224 and 225 act as evaporators of the thermal refrigeration system. Heat exchanger 224 is referred to as a chiller (e.g., a liquid-liquid heat exchanger) herein, while heat exchanger 225 is referred to as an evaporator (e.g., a liquid-gas heat exchanger). To illustrate, heat exchanger 224 may include a flat plate heat exchanger (e.g., in a crossflow, co-flow, or counter flow arrangement), channeled heat exchanger, a tube and shell heat exchanger, any other suitable heat exchanger, or any combination thereof. To illustrate further, heat exchanger 225 may include a flat plate heat exchanger (e.g., in a crossflow, co-flow, or counter flow arrangement), channeled heat exchanger, an intercooler, a tube and shell heat exchanger, any other suitable heat exchanger, or any combination thereof. In some embodiments, one or both of heat exchangers 224 and 225 have control valves (e.g., flow control valves) arranged at the inlet, outlet, or both of either or both streams to control one or more flow rates (e.g., of refrigerant, coolant, or air).

Battery cooling system 230 may be included as part of, or otherwise interfaced to, battery system 130 of FIG. 1. In some embodiments, battery cooling system 230 includes a liquid circulation system for cooling one or more battery modules, each including a plurality of battery cells. For example, as illustrated, battery cooling system 230 includes pump 231 and heat load 232 (e.g., a plurality of battery cells and/or power electronics), which exchange heat with heat exchanger 224. In some embodiments, control circuitry 210 or another suitable control system is configured to adjust the flow rate, pressure, or both, provided by pump 231. For example, the pump may be controlled to increase flow rate as heat load increases (e.g., for a rotary pump coupled to at motor, the rotation rate may be increased by increasing motor current/rotation rate). In a further example, the battery cooling system may include one or more control valves for diverting, adjusting, or otherwise controlling flow based on the heat load. To illustrate, as the current demand increases from the battery pack (e.g., heat load 232), the cooling requirement in kW may also increase to maintain the battery pack temperature within an operable range (e.g., below a temperature limit to avoid overheating). For example, the heat rejection of heat load 232 may depend on driving conditions (e.g., current demand at electric motors of the drivetrain of the vehicle), ambient conditions, one or more temperature limits (e.g., of battery cells, battery modules, battery coolant temperature, power electronics temperature, or any other suitable temperature), any other suitable criterion, or any combination thereof. It will be understood that battery cooling system 230 may include any of the components illustrated, any other suitable components not illustrated, or any combination thereof.

Cabin air system 240 may be the same as or similar to, or included as part of, cabin air system 140 of FIG. 1. In some embodiments, cabin air system 240 includes an air circulation system for providing temperature-controlled air to an occupant compartment of a vehicle. For example, as illustrated, cabin air system 240 includes blower 241, configured to blow air through, and exchange heat with, heat exchanger 225. In some embodiments, blower 241 is controlled by control circuitry 210 based on input from user interface 206 (e.g., a position of a turnable knob), input from another controller (e.g., a central controller), or input from any other suitable source. In some embodiments, one or more flow control valves, diversion valves (e.g., bypass valves), or dampers may be coupled to heat exchanger 225 to control refrigerant flow and/or air flow. For example, heat transfer, fluid temperature, or both may be controlled by controlling a flow rate through heat exchanger 225. In some embodiments, one or more flow control valves may be included to control flow rates through heat exchangers 224 and 225 (e.g., relative flow rates, total flow rate, or otherwise each individual flow rate). It will be understood that cabin air system 240 may include any of the components illustrated, any other suitable components not illustrated, or any combination thereof.

Illustrative system 200 of FIG. 2 may be used to control any suitable cooling system disclosed herein, in accordance with the present disclosure. In some embodiments, not all components shown in FIG. 2 need be included in system 200. For example, in some embodiments, control circuitry may be configured to control cooling system 220, while battery cooling system 230 and cabin air system 240 are controlled by other control circuitry (e.g., a separate processor and/or control algorithm). In some embodiments, control circuitry 210 is configured to determine an operation mode such as cabin-only (e.g., heat transfer at heat exchanger 225 only), battery only (e.g., heat transfer at heat exchanger 224 only), or hybrid cooling (e.g., heat transfer at heat exchangers 224 and 225). For example, control circuitry 210 may execute computer readable instructions stored on non-transitory computer readable media to select from among operating modes (e.g., based on input from user interface 206) and then generate and transmit control signals to cooling system 220, battery cooling system 230, cabin air system 240, or a combination thereof.

Figure 3:
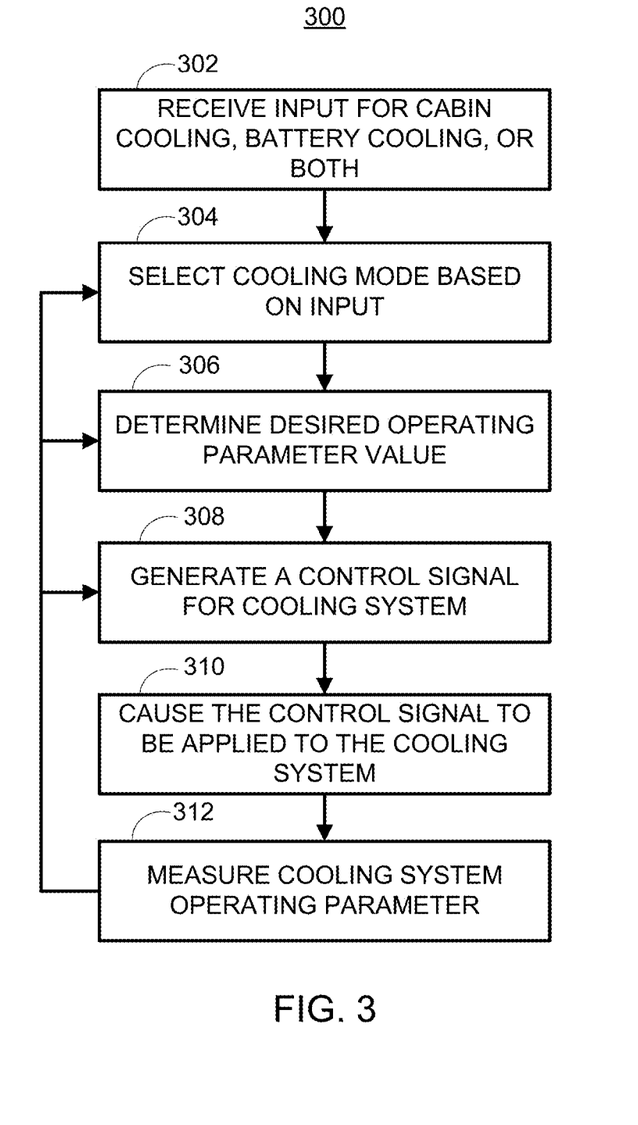
FIG. 3 shows a flowchart of an illustrative process for controlling vehicle cooling, in accordance with some embodiments of the present disclosure.

FIG. 3 shows a flowchart of illustrative process 300 for controlling vehicle cooling, in accordance with some embodiments of the present disclosure. To illustrate, the illustrative steps of process 300 may be performed by system 200 of FIG. 2 or vehicle 100 of FIG. 1 (e.g., a control system thereof).

Step 302 includes receiving an input for cabin cooling, battery cooling, or both. Input may be received from an interface (e.g., a user interface), another controller, another algorithm or set of instructions, a mobile device, memory (e.g., retrieved from memory), any other suitable source, or any combination thereof. For example, in some embodiments, the input is received from a user interface, a central controller, other control circuitry, or a combination thereof. In a further example, the cabin air cooling target may be selected by a vehicle occupant using a user interface, while the battery cooling target may be determined by control circuitry based on a temperature and/or heat load of the battery system. In some embodiments, the input includes a temperature setting (e.g., an air, coolant, refrigerant, or component temperature), a cooling setting (e.g., an amount of energy, power, or duty cycle), an indication of an operating mode (e.g., "low," "high," numerically indexed setting, or other predetermined discretization of operating), any other input type, or any combination thereof. In some embodiments, the system may receive more than one input such as, for example, a cabin air target and a battery cooling system target. In some embodiments, the system may generate a queue of inputs, ordered by priority, temporal succession (e.g., in order received), or a combination thereof. The system may be configured to receive inputs at a particular time or frequency, receive inputs as transmitted to the system, in response to an event, or a combination thereof. In some embodiments, the system need not perform 302 and may determine target values based on some other suitable criterion.

Step 304 includes selecting a cooling mode. In some embodiments, selecting the cooling mode is based on the input of step 302. In some embodiments, the system selects the cooling mode based on the cooling requirements at that instant. For example, if input is received to provide cabin cooling (e.g., user-selected air conditioning), but no battery cooling or change in battery cooling is needed (e.g., a relatively low current demand or ambient temperature), then the system may select cabin-only mode. In a further example, if input is received to provide battery cooling (e.g., a relatively high current demand or ambient temperature), but not cabin air cooling (e.g., occupant using only non-conditioned air or a heater), then the system may select battery-only mode. In a further example, if input is received to provide both battery cooling (e.g., a relatively high current demand or ambient temperature) and cabin air cooling (e.g., user-selected air conditioning), then the system may select a hybrid mode.

Step 306 includes determining a desired operating parameter value. In some embodiments, determining a desired operating parameter value is based on the input of step 302, the cooling mode of step 304, or a combination thereof. In some embodiments, the system may determine a desired operating parameter value (e.g., a target value) for each input that is received. In some embodiments, the system may determine a desired operating parameter value based on all inputs received. For example, the system may select a cabin-only cooling mode at step 304, and then determine a target evaporator air outlet temperature or cabin cooling power request at step 306. In a further example, the system may select a battery-only mode at step 304, and then determine a target battery coolant temperature (e.g., an inlet temperature at the battery system), or a battery cooling power request at step 306. In a further example, the system may select a hybrid mode at step 304, and then determine a target evaporator air outlet temperature and control the battery coolant pump to balance temperature and the total cooling power request (e.g., cabin plus battery cooling power requests). In another example, in hybrid mode, the system may select a minimum or maximum value as the desired operating parameter value. To illustrate, the system may select a minimum heat exchanger temperature, minimum fluid temperature, maximum cooling power, any other suitable extrema, or any combination thereof.

At step 306, or alternatively at step 308, the system determines a compressor suction pressure target based on the desired operating parameter value or target value (e.g., evaporator temperature, cooling power, or other suitable parameter)). For example, the system determines the compressor suction pressure target based on the target value (e.g., evaporator temperature, cooling power, or other suitable input). To illustrate the system may access a database, look-up table, function, model, logic tree, algorithm, any other suitable mapping between one or more inputs and compressor suction pressure target, or any combination thereof.

Step 308 includes generating a control signal for the cooling system. In some embodiments, the system generates the control signal based on the desired operating parameter value determined at step 306. In some embodiments, for example, the system may select from among more than one desired operating parameter value determined at step 306 based on any suitable criterion. In some embodiments, the system may determine a compressor suction pressure target based on the mode selected at step 304, the desired operating parameter value of step 306, or a combination thereof. For example, the system may determine a target temperature (e.g., a fluid temperature, an evaporator temperature, a component temperature), target pressure, target cooling power, or a combination thereof at step 306, and then use a mapping or database to determine a corresponding suction pressure target. To illustrate, the larger the cooling power or lower the target temperature, the lower the suction pressure that may be determined. At step 308, the system may generate an analog signal, a pulse width modulation signal, a pulse density modulation signal, a digital signal, a signal indicative of text or a message, any other suitable signal, or any combination thereof. For example, the system may generate any suitable control signal and transmit the control signal to a motor controller (e.g., motor power electronics). In a further example, the control signal may be indicative of a compressor speed target that corresponds to the compressor suction pressure target. In some embodiments, the system applies a feedforward controller, a feedback controller, any other suitable controller, or a combination thereof. For example, the system may apply a feedforward controller to determine a compressor suction pressure (e.g., and a corresponding compressor speed target) based on one or more inputs, apply a feedback controller on the actual suction pressure, and generate the control signal based on both the feedforward controller and the feedback controller. To illustrate, the system may apply the feedforward controller to account for disturbances to either the cabin air system or the battery system, to avoid cycling the compressor on/off or causing the cabin air temperature to fluctuate, for example. The cabin air system and battery system may each have corresponding controllers, and a request of the other system may present a disturbance to either controller due to heat transfer not modeled by the respective controller. The feedforward controller, which may be based on a physical model, provides a signal component that accounts for the other system to anticipate the disturbance.

Step 310 includes causing the control signal of step 308 to be applied to the cooling system. In some embodiments, the system generates the control signal at step 308, and transmits the signal at step 310 to affect control of the cooling system. In some embodiments, the system includes a motor controller, power electronics, or both, and interfaces to the compressor motor by one or more phase leads. In some embodiments, the system includes an I/O interface (e.g., I/O 216 of FIG. 2) for transmitting the control signal. In some embodiments, steps 308 and 310 may be combined, wherein the system may generate and apply the control signal as part of a single operation. In some embodiments, for example, the system may determine a desired parameter value at step 308, and generate an electrical signal for output at step 310.

In some embodiments, at step 310, control circuitry (e.g., control circuitry 210 of FIG. 2) of the system generates a signal for controlling the compressor (e.g., compressor 221 of FIG. 2). For example, the control circuitry may generate an analog signal, pulse-width modulation signal, pulse-density modulation signal, digital signal, any other suitable signal, or any combination thereof that may be transmitted to a motor controller, power electronics, or any other suitable power circuitry for controlling current flow in one or more phases of a motor coupled to the compressor. In some embodiments, for example, the control signal is indicative of compressor speed (e.g., and may be transmitted to a variable frequency drive or other suitable motor controller). In some embodiments, for example, the control signal is indicative of phase current (e.g., and may be provided to power electronics or other suitable motor controller).

Step 312 includes measuring a cooling system operating parameter. In some embodiments, the system senses one or more operating parameters for use as a feedback signal to a feedback controller. To illustrate, the system may use or more sensors (e.g., sensors 204 of FIG. 2) to sense pressure (e.g., a fluid pressure, suction pressure, or any other suitable pressure), temperature (e.g., a fluid temperature, ambient temperature, component temperature, or any other suitable temperature), a shaft speed (e.g., of a motor shaft, compressor shaft, or fan shaft), any other suitable parameter, or any combination thereof. The system may perform step 312 continuously, at a predetermined frequency, in response to an event, or a combination thereof, during the performance of other steps of process 300. For example, the system may monitor one or more sensor signals, and sample the one or more sensor signals for the feedback controller if the operating mode or control technique relies on a feedback signal. To illustrate, the system may receive a sensor signal (e.g., from sensors 204 of FIG. 2), and compare a value based on the sensor signal and a target value (e.g., a difference thereof) to determine the feedback control signal.

In an illustrative example, at least one input indicative of the desired operating parameter value may be received, such as a target temperature or target cooling power, that corresponds to the cabin air system, the battery system or both. The system may determine a compressor suction pressure target, compressor speed target, or both, based on the at least one input, and optionally any other suitable inputs, and then determine a control signal based on the compressor suction pressure target or compressor speed target. To illustrate, the compressor suction pressure and compressor speed may be related by a function, table, model, or other suitable mapping, parameterized by any other suitable inputs (e.g., blower speed, ambient temperature, evaporator air-off target temperature, inlet coolant temperature, outlet cooling temperature, refrigerant temperature at a chiller inlet or outlet, any other suitable input for a feed forward controller, or any combination thereof). The system transmits the control signal to a motor controller, which may be included in the system or be a separate system, wherein the motor controller controls operation of the compressor. To illustrate, by controlling the speed or suction pressure of the compressor, rather than temperature or cooling power directly, the system may avoid time latencies or instabilities due to the thermal capacitance of the cabin air system and battery cooling system. For example, in some circumstances, the response of the compressor speed and pressure may occur faster (e.g., on a shorter time scale) than changes in temperature. Accordingly, in some embodiments, by using feedforward and feedback control, the system is able to compensate for disturbances that may arise from providing cooling to the two independent systems (e.g., the cabin air system and the battery cooling system). The system may implement feedback control on compressor suction pressure, compressor speed, or a combination thereof. In some embodiments, depending on cooling mode for example, the system may implement feedback control based on temperature (e.g., evaporator fluid temperature, air temperature, coolant temperature, or component temperature) or cooling power (e.g., cabin cooling power, battery cooling power, or both).

In an illustrative example, the cooling load of the cabin system may be relatively less than the cooling load of the battery system. If the system is actively providing cooling to the cabin air system (e.g., to maintain a desired evaporator temperature or cooling power), and receives a request for cooling from the battery system, the system may begin to provide active cooling to a chiller. Accordingly, at the transition from cabin-only to hybrid-mode, the battery system may present a disturbance to cooling of the cabin air system. The system may apply the feedforward controller to reduce this disturbance, by adjusting the target up front rather than waiting for the feedback controller to sense and respond to the disturbance.

Figure 4:
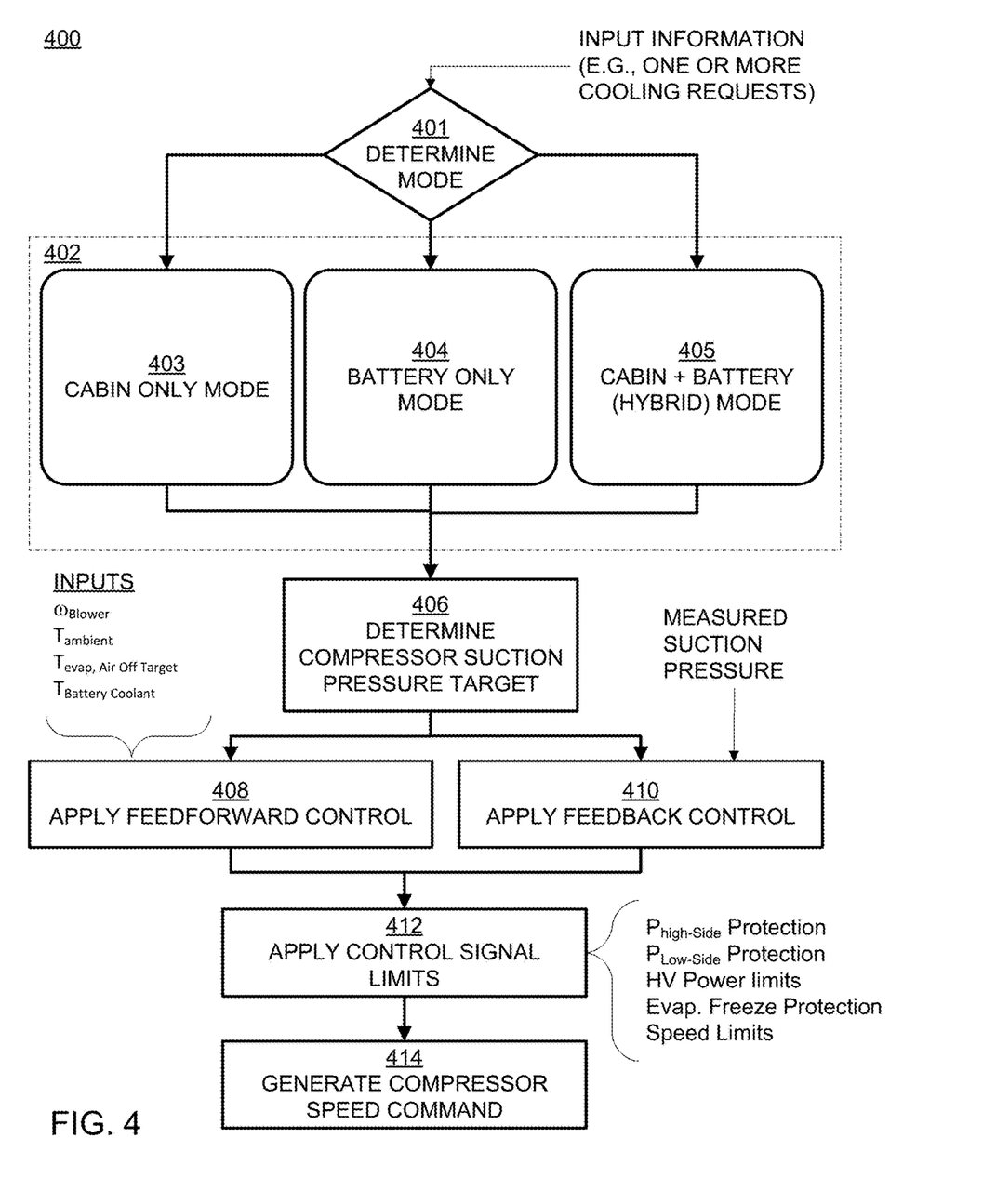
FIG. 4 shows a flowchart of an illustrative process for managing vehicle cooling, in accordance with some embodiments of the present disclosure.

FIG. 4 shows a flowchart of illustrative process 400 for managing vehicle cooling, in accordance with some embodiments of the present disclosure. To illustrate, the illustrative steps of process 400 may be performed by system 200 of FIG. 2 or vehicle 100 of FIG. 1 (e.g., or a control system thereof). The illustrative steps of processes 300 and 400 of FIGS. 3-4 may be combined, omitted, substituted, or otherwise modified in accordance with the present disclosure. In an illustrative example, process 400 may include applying a hybrid mode based on compressor suction pressure, to lessen interrupts or delayed responses in compressor operation to meet the cooling demands of a battery system and cabin system.

Step 401 includes the system determining an operating mode. In some embodiments, the system may determine the operating mode based on input information from a user interface, memory, another controller or control circuitry, a device, any other suitable source, or any combination thereof. In some embodiments, for example, the system may select the mode from among a cabin-only mode, a battery-only mode, and a hybrid cabin-battery mode. In some embodiments, the system may operate using a single mode (e.g., a hybrid mode), and may select a mode for determining one or more desired values or target values. In an illustrative example, step 401 may be the same as, or otherwise include aspects of, step 302 of process 300. In a further example, process 400 may represent an illustrative example of process 300.

Block 402 includes several illustrative techniques for estimating a compressor suction pressure target. To illustrate, the system may perform any or all of steps 403-405 to determine a desired parameter value or target value, a control approach (e.g., feedforward, feedback, or both), inputs (e.g., which inputs are used to determine an output or control signal), or a combination thereof, and then determine a compressor suction pressure target based on any or all of these values. To illustrate, the system may determine a compressor suction pressure target based on one or more input values based on any suitable reference or mapping (e.g., a database, look-up table, model, function, logic tree, or any combination thereof).

Step 403 includes the system selecting, initiating, or otherwise determining to operate in, a cabin-only cooling mode. In some embodiments, while in cabin-only mode, the system controls cooling based on a target evaporator air temperature (e.g., an air out temperature), a cabin cooling power request, an estimated cooling load, any other suitable criterion, or any combination thereof. To illustrate, in cabin-only mode, the system controls the cooling system (e.g., a compressor thereof) to remove heat via an evaporator from air (e.g., as provided by a blower fan) being directed to the cabin for air conditioning. To illustrate further, in cabin-only mode, the battery system may likely experience a relatively low current demand, relatively low ambient temperatures, or otherwise be operating at a temperature within a predetermined range (e.g., and active cooling is not applied). In some circumstances, for example, the system may determine to enter cabin-only mode if an input is received (e.g., from a user at a user interface) to request air conditioning, while the battery system does not require active cooling.

Step 404 includes the system selecting, initiating, or otherwise determining to operate in, a battery-only cooling mode. In some embodiments, while in battery-only mode, the system controls cooling based on a target battery coolant temperature (e.g., chiller inlet or outlet temperature), a refrigerant temperature (e.g., chiller inlet or outlet temperature), a battery cooling power request, an estimated cooling load, a battery system temperature, any other suitable criterion, or any combination thereof. To illustrate, in battery-only mode, the system controls the cooling system (e.g., a compressor thereof) to remove heat via a chiller from coolant (e.g., as provided by a coolant pump) being directed to the battery system for cooling. To illustrate further, in battery-only mode, the battery system may likely experience a relatively high current demand, relatively high ambient temperatures, or otherwise be operating at conditions requiring heat removal. In some circumstances, for example, the system may determine to enter battery-only mode if no input is received (e.g., from a user at a user interface) to request air conditioning, while the battery system requires active cooling (e.g., from a large current demand associated with causing a large acceleration).

Step 405 includes the system selecting, initiating, or otherwise determining to operate in, a hybrid cooling mode. In some embodiments, while in hybrid mode, the system controls cooling based on a evaporator air temperature target (e.g., an air out temperature), a refrigerant temperature target (e.g., an inlet or outlet temperature), a battery system coolant inlet temperature target, a cabin cooling power request, a battery cooling power request, a battery system coolant pump speed (e.g., using a motor controller), a total cooling power request, an estimated total cooling load, a blower speed (e.g., using a motor controller), any other suitable criterion, or any combination thereof. To illustrate, in hybrid mode, the system controls the cooling system to remove heat via a chiller from coolant being directed to the battery system for cooling, as well as remove heat via an evaporator from air being directed to a cabin. In some circumstances, for example, the system may determine to enter hybrid mode if an input is received to request air conditioning, while the battery system also requires active cooling.

Step 406 includes the system determining a compressor suction pressure target. For example, the system may determine the compressor suction pressure target based on the mode selected at block 402 (e.g., one of steps 403-405), and a desired target value of one or more operating parameters. In some embodiments, the system determines a total cooling power or a temperature (e.g., a chiller or evaporator temperature) and then determines a compressor suction pressure target based on that value. To illustrate, the system may use a database, mapping, function, model, logic tree, or any other suitable reference to determine the compressor suction pressure target based on the cabin and battery system requests (e.g., input information). In some embodiments, for example, the system may sum the cooling power requests in hybrid mode (e.g., or take either cooling power request in cabin-only or battery-only mode) and then determine a suction pressure that corresponds to the summed value.

In some embodiments, the system may determine a value indicative of compressor suction pressure, a proxy for suction pressure, or otherwise a value that may be modeled as related to suction pressure. In some embodiments, the system determines a target value of compressor suction pressure to avoid latency in monitoring a temperature (e.g., and evaporator temperature, or fluid temperature). To illustrate, the system may control operation of the compressor by adjusting compressor speed, and pressure may respond relatively quickly based on the compressor speed and any suitable input values (e.g., inputs to step 408) as compared to fluid or component temperatures.

Step 408 includes the system applying feed forward control. In some embodiments, step 408 includes generating a feedforward control signal. In some embodiments, the system takes as input blower speed (e.g., of a cabin air blower) ($\omega_{blower}$), ambient temperature ($T_{ambient}$), evaporator air-off target temperature ($T_{evap,\ Air\ Off\ Target}$), battery coolant target temperature (e.g., inlet coolant temperature, outlet cooling temperature, refrigerant temperature at a chiller inlet or outlet), any other suitable input for a feed forward controller, or any combination thereof. In some embodiments, the system may reference a model (e.g., a physics-based model) to determine a feedforward control signal, based on the inputs received. In some embodiments, the system may reference a lookup table, database, set of functions, set of logic operations, or any other suitable reference information or mapping to determine a feedforward signal based on one or more inputs. In an illustrative example, the feed forward control of step 408 may help avoid or eliminate oscillations of the compressor, on/off cycling of the compressor, varying cabin air conditions or battery coolant conditions, avoid or eliminate lag in reaching a desired setpoint, or otherwise improve cooling control (e.g., when two cooling loads are included). To illustrate, compressor speed and compressor suction pressure may be related, and may be parameterized by any of the illustrative inputs shown in FIG. 4 or any other suitable inputs. The system may determine a compressor suction pressure target for inputting to both a feedforward and a feedback controller. The output of each controller may be a target compressor speed, which may be determined based on the compressor suction pressure target and any suitable parameter values (e.g., input values).

In an illustrative example, step 408 may take as input a cabin blower setting (e.g., based on user input to a control knob or setting), an ambient temperature (e.g., as measured by a temperature sensor or received as an information input), an evaporator temperature (e.g., an outlet air temperature, or an inlet or outlet temperature of refrigerant), a battery coolant temperature (e.g., an inlet and/or outlet temperature of refrigerant and/or coolant), or alternative or additional inputs. In some embodiments, the system stores a reference model, equation, set of logic instructions, a database, or a combination thereof for taking one or more inputs and generating an output (e.g., a feedforward signal). To illustrate, an evaporator air outlet temperature may range from 0-20° C. or any other suitable limit. In a further illustrative example, a battery coolant temperature may range from 25-40° C. or any other suitable limit.

Step 410 includes the system applying feedback control. In some embodiments, step 410 includes generating a feedback signal. The system may apply feedback control on any suitable variable or combination of variables for which feedback is available and monitored. In some embodiments, while step 408 is used to account for disturbances, step 410 may be used to achieve a target value based on a measured feedback signal (e.g., from one or more sensors). In some embodiments, the system may receive a signal from a pressure sensor arranged at the compressor inlet and configured to measure suction pressure. The system may apply feedback control (e.g., proportional, integral, derivative, or a combination thereof such as PID control) to achieve the target suction pressure determined at step 406. For example, the system may determine a difference or error between the measured suction pressure and the desired suction pressure, and then generate a feedback signal indicative of the difference as an output. The output of step 410 may be used, for example, to control the speed of the compressor (e.g., by controlling current provided to the motor coupled to the compressor). To illustrate, as the compressor rotates at a higher speed, the suction pressure decreases (e.g., a faster rotation of the motor from a larger current or voltage at the phase leads results in a lower suction pressure). To illustrate further, suction pressure may also be a function of cooling load on the cooling system. For example, cooling load on the refrigeration system may increase with a hotter cabin, hotter battery temperatures resulting from hotter battery coolant temperatures, hotter ambient temperatures, lower cooling temperature demands, or a combination thereof.

Step 412 includes the system applying one or more control signal limits. For example, in some embodiments, the system generates a control signal based on the output of steps 408 and 410, and then applies one or more limits, saturations, or other suitable modifications before generating and applying a compressor speed command at step 414. Illustrative limits include, for example, high-side pressure, low-side pressure, power limits (e.g., of a high-voltage system), temperature lower (e.g., evaporator freeze protection) and upper limits, speed limits (e.g., shaft rotation rate limits for fans, motors, compressors, pumps, or a combination thereof), any other suitable limits on the control signal, or any combination thereof. In some embodiments, step 412 includes applying a rate limit to the one or more control signals, to limit a change in the one or more signals. In some embodiments, step 412 need not be performed, and the compressor speed command may be generated at step 414 not subject to limits. In some embodiments, step 412 may be applied selectively to either of, or both of the outputs of steps 408 and 410. For example, the feedforward controller may have a first set of corresponding limits imposed, while the feedback controller may have a second set of corresponding limits imposed. In some embodiments, step 412 may be included in or otherwise combined with either or both of steps 408 and 410.

Step 414 includes the system generating a compressor speed command. In some embodiments, step 414 includes applying the command to power electronics, a controller (e.g., a motor controller), any other suitable component or module, or any combination thereof. For example, in some embodiments, the system includes an input/output interface (e.g., I/O 216) configured to output electrical signals, optical signals, wireless signals, or a combination thereof to control the cooling system. In an illustrative example, the system may sum the outputs of steps 408 and 410, apply any suitable limits at step 412, and then at step 414 apply the resulting control signal to a motor drive (e.g., included as part of the system, or as a separate component) to control the compressor motor. In some embodiments, step 414 corresponds to step 308 of process 300 of FIG. 3, and process 310 of process 30 may receive the output of step 412 or step 414 to control the compressor.

In an illustrative example, the system may determine a suction pressure target at step 406 based on which operating mode is selected at step 401. For example, in cabin-only cooling mode, the system may determine a feedforward suction pressure at step 408 based on a cabin cooling energy demand and apply feedback control at step 410 based on an error of targeted evaporator temperature and actual evaporator temperature (e.g., a difference), or an error between a target and actual value of any other suitable parameter. In a further example, in battery-only cooling mode, the system may determine a feedforward suction pressure at step 408 based on a battery cooling energy demand and apply feedback control at step 410 based on an error of targeted chiller/evaporator temperature and actual chiller/evaporator temperature. In a further example, in hybrid cooling mode, the system may apply a feedforward control at step 408 based on cabin cooling and battery cooling energy demand and respective chiller/evaporator (e.g., for cabin air) and coolant temperature (e.g., for the battery system) target values.

In an illustrative example, the system may select a hybrid cooling mode and determine a cabin cooling target and a battery cooling target. In some embodiments, the system may determine a suction pressure corresponding to each target and then select the minimum suction pressure as the target pressure. In some embodiments, the system may determine a suction pressure corresponding to each target and then combine the suction pressure to determine a target suction pressure. For example, the system may sum the reciprocals of each suction pressure, and then take the reciprocal of the result as the target suction pressure. In some embodiments, the system inputs each target into a model such as a function, database, map, or other reference to determine a target suction pressure.

In some embodiments, for example, cabin cooling may be given priority. In some embodiments, the system transitions from a cabin-only mode to a hybrid mode of the vehicle cooling system based on a cooling request of the battery system, and the compressor suction pressure target is determined to reduce cooling disturbances to the cabin as a result of transitioning from the cabin-only mode to the hybrid mode. For example, the system may apply hybrid-mode control to prevent or otherwise limit disturbances to the cabin air temperature provided (e.g., the evaporator air outlet temperature), even with disturbances presented by the battery cooling system (e.g., a transition from cabin-only to hybrid mode). In a further example, the system may implement the hybrid mode (e.g., "cabin+battery mode") to prioritize the cabin air cooling by applying the cabin air cooling target (e.g., temperature target, suction pressure target). The system then determines a compressor suction pressure target that corresponds to the cabin air cooling target and the battery system cooling target. In some embodiments, if there exists a mismatch between cooling demand (e.g., from the cabin system and the battery system) and cooling capacity (e.g., of the thermal refrigeration system), the system may reduce cooling provided to the battery system (e.g., via the chiller) in order to maintain the cabin temperature.

In an illustrative example, process 400 may repeat, and over time, depending on the inputs received, one or more transitions may occur (i) between modes, (ii) between settings in a single mode, or a combination thereof. For example, a user may turn on max air conditioning or otherwise adjust the cabin cooling request, the battery system may request a change in cooling or heating, or otherwise a change in cooling request may occur, in which case new compressor suction pressure targets are determined. In a further example, when a change in request or input (e.g., a user input, battery system input, or parameter value) occurs, the system may control the compressor based only on the feedforward control for a period of time (e.g., until the target is expected to be approximately reached), and then implements (e.g., turns on/phases-in) the feedback controller.

In an illustrative example, process 400 is directed to method for controlling a vehicle cooling system configured to provide cooling to a cabin and a battery system. The system may determine a compressor suction pressure target at an inlet of a compressor of the vehicle cooling system at step 406 (e.g., based on input information received at step 401, a cooling mode of block 402, or a combination thereof). The system generates a control signal at step 412 and/or step 414 based on the compressor suction pressure target of step 406, and causes a suction pressure of the compressor to be adjusted based on the control signal (e.g., the output of step 414) to achieve the compressor suction pressure target (e.g., at step 310 of FIG. 3). In some embodiments, the system may be configured to, at block 402 (e.g., or step 304 of process 300), select from among a hybrid mode (e.g., step 405), a cabin-only mode (e.g., step 403), and a battery-only mode (e.g., step 404) for the vehicle cooling system. In some embodiments, the system is configured to receive at least one cooling request (e.g., input information in FIG. 4, or step 302 of FIG. 3), wherein selecting from among the hybrid mode, the cabin-only mode, and the battery-only mode for the vehicle cooling system at block 402 (or step 304 of FIG. 3) is based on the at least one cooling request. In some embodiments, for example, the system receives input information that my include a first input indicative of a desired cooling target of the cabin (e.g., a first cooling request), and receives a second input indicative of a desired cooling target of the battery system (e.g., a second cooling request). The system then determines the compressor suction pressure target based on the first input and the second input.

In an illustrative example, the system generates the control signal at step 412 and/or step 414 (e.g., or step 308 of FIG. 3) by generating a feedforward signal (e.g., at step 408) based on a mapping between the compressor suction pressure target and a speed of the compressor, and generating a feedback signal (e.g., at step 410) based on a sensor signal corresponding to the suction pressure of the compressor (e.g., as measured by sensors 204 of FIG. 2). To illustrate, the system may be configured to sense at least one of the suction pressure of the compressor, an evaporator temperature, or a coolant temperature of the battery system (e.g., at step 312 of FIG. 3) using any suitable sensor (e.g., sensors 204).

The foregoing is merely illustrative of the principles of this disclosure and various modifications may be made by those skilled in the art without departing from the scope of this disclosure. The above described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

What is claimed is:

1. A method for controlling a vehicle cooling system configured to provide cooling to a cabin and a battery system, the method comprising:
   predicting a disturbance based on how cooling of one of the cabin or the battery system affects cooling of the other one of the cabin or the battery system;
   determining a compressor suction pressure target at an inlet of a compressor of the vehicle cooling system based on the disturbance;
   generating a control signal based on the compressor suction pressure target; and
   causing a suction pressure of the compressor to be adjusted based on the control signal to achieve the compressor suction pressure target.

2. The method of claim 1, further comprising selecting from among a hybrid mode, a cabin-only mode, and a battery-only mode for the vehicle cooling system.

3. The method of claim 2, further comprising receiving at least one cooling request, wherein selecting from among the hybrid mode, the cabin-only mode, and the battery-only mode for the vehicle cooling system is based on the at least one cooling request.

4. The method of claim 1, further comprising:
   receiving a first input indicative of a desired cooling target of the cabin; and receiving a second input indicative of a desired cooling target of the battery system, wherein the compressor suction pressure target is determined based on the first input and the second input.

5. The method of claim 1, further comprising transitioning from a cabin-only mode to a hybrid mode of the vehicle cooling system based on a cooling request of the battery system, wherein the compressor suction pressure target is determined to reduce cooling disturbances to the cabin as a result of transitioning from the cabin-only mode to the hybrid mode.

6. The method of claim 1, wherein generating the control signal comprises:
generating a feedforward signal based on a mapping between the compressor suction pressure target and a speed of the compressor; and
generating a feedback signal based on a sensor signal corresponding to the suction pressure of the compressor.

7. The method of claim 1, further comprising sensing the suction pressure of the compressor, an evaporator temperature, or a coolant temperature of the battery system or combinations thereof.

8. A system for providing cooling to a cabin and a battery system of a vehicle, the system comprising:
a thermal refrigeration system comprising a compressor; and
control circuitry coupled to the thermal refrigeration system and configured to:
predict a disturbance based on how cooling of one of the cabin or the battery system affects cooling of the other one of the cabin or the battery system;
determine a compressor suction pressure target at an inlet of the compressor based on the disturbance;
generate a control signal based on the compressor suction pressure target; and
cause a suction pressure of the compressor to be adjusted based on the control signal to achieve the compressor suction pressure target.

9. The system of claim 8, wherein the control circuitry is further configured to select from among a hybrid mode, a cabin-only mode, and a battery-only mode.

10. The system of claim 9, wherein the control circuitry is further configured to:
receive at least one cooling request at an input interface; and
select from among the hybrid mode, the cabin-only mode, and the battery-only mode based on the at least one cooling request.

11. The system of claim 8, wherein the control circuitry is further configured to:
receive a first input indicative of a desired cooling target of the cabin; and
receive a second input indicative of a desired cooling target of the battery system, wherein the compressor suction pressure target is determined based on the first input and the second input.

12. The system of claim 8, wherein the control circuitry is further configured to transition from a cabin-only mode to a hybrid mode of the vehicle cooling system based on a cooling request of the battery system, wherein control circuitry is configured to determine the compressor suction pressure target to reduce cooling disturbances to the cabin as a result of transitioning from the cabin-only mode to the hybrid mode.

13. The system of claim 8, wherein the control circuitry is configured to generate the control signal by:

generating a feedforward signal based on a mapping between the compressor suction pressure target and a speed of the compressor; and
generating a feedback signal based on a sensor signal corresponding to the suction pressure of the compressor.

14. The system of claim 8, wherein the control circuitry is further configured to sense the suction pressure of the thermal refrigeration system, an evaporator temperature of the thermal refrigeration system, or a coolant temperature thermally coupled to the thermal refrigeration system or combinations thereof.

15. The system of claim 8, wherein:
the thermal refrigeration system is thermally coupled to a cabin air system by an evaporator;
the thermal refrigeration system is thermally coupled to a battery cooling system by a chiller; and
the control circuitry is further configured to control the cabin air system, the battery cooling system, or both.

16. A non-transitory computer-readable medium having instructions encoded thereon that when executed by control circuitry cause the control circuitry to:
predict a disturbance based on how cooling of one of the cabin or the battery system affects cooling of the other one of the cabin or the battery system;
determine, based on the disturbance, a compressor suction pressure target at an inlet of a compressor of a vehicle cooling system configured to provide cooling to a cabin and a battery system;
generate a control signal based on the compressor suction pressure target; and
cause a suction pressure of the compressor to be adjusted based on the control signal to achieve the compressor suction pressure target.

17. The non-transitory computer-readable medium of claim 16, further comprising instructions encoded thereon that when executed by the control circuitry cause the control circuitry to select from among a hybrid mode, a cabin-only mode, and a battery-only mode for the vehicle cooling system.

18. The non-transitory computer-readable medium of claim 16 further comprising instructions encoded thereon that when executed by the control circuitry cause the control circuitry to:
receive a first input indicative of a desired cooling target of the cabin; and
receive a second input indicative of a desired cooling target of the battery system, wherein the compressor suction pressure target is determined based on the first input and the second input.

19. The non-transitory computer-readable medium of claim 16, further comprising instructions encoded thereon that when executed by the control circuitry cause the control circuitry to transition from a cabin-only mode to a hybrid mode of the vehicle cooling system based on a cooling request of the battery system, wherein the compressor suction pressure target is determined to reduce cooling disturbances to the cabin as a result of transitioning from the cabin-only mode to the hybrid mode.

20. The non-transitory computer-readable medium of claim 16, further comprising instructions encoded thereon that when executed by the control circuitry cause the control circuitry to generate the control signal by:
generating a feedforward signal based on a mapping between the compressor suction pressure target and a speed of the compressor; and generating a feedback signal based on a sensor signal corresponding to the suction pressure of the compressor.

* * * * *